US012696216B2

(12) United States Patent
Takizawa et al.

(10) Patent No.: US 12,696,216 B2
(45) Date of Patent: Jul. 28, 2026

(54) COOPERATIVE WIRELESS DEVICE AND PROGRAM FOR SAME

(71) Applicant: National Institute of Information and Communications Technology, Tokyo (JP)

(72) Inventors: Kenichi Takizawa, Tokyo (JP); Satoshi Yasuda, Tokyo (JP); Nobuyasu Shiga, Tokyo (JP)

(73) Assignee: National Institute of Information and Communications Technology, Tokyo (JP)

( * ) Notice: Subject to any disclaimer, the term of this patent is extended or adjusted under 35 U.S.C. 154(b) by 377 days.

(21) Appl. No.: 18/547,710

(22) PCT Filed: Feb. 9, 2022

(86) PCT No.: PCT/JP2022/005040
§ 371 (c)(1),
(2) Date: Aug. 24, 2023

(87) PCT Pub. No.: WO2022/190750
PCT Pub. Date: Sep. 15, 2022

(65) Prior Publication Data
US 2024/0147398 A1 May 2, 2024

(30) Foreign Application Priority Data
Mar. 8, 2021 (JP) ................................. 2021-036112

(51) Int. Cl.
*H04W 56/00* (2009.01)
*H04L 27/26* (2006.01)
(52) U.S. Cl.
CPC ..... *H04W 56/0065* (2013.01); *H04L 27/2657* (2013.01); *H04W 56/005* (2013.01)

(58) Field of Classification Search
None
See application file for complete search history.

(56) References Cited

U.S. PATENT DOCUMENTS

2009/0285315 A1* 11/2009 Wu ....................... H04L 25/022
375/260
2014/0307648 A1 10/2014 Nagata et al.
(Continued)

FOREIGN PATENT DOCUMENTS

| JP | 2013042342 A | 2/2013 |
| JP | 2018152749 A | 9/2018 |
| WO | 2014174584 A1 | 10/2014 |
| WO | 2017150033 A1 | 9/2017 |

OTHER PUBLICATIONS

Office Action for corresponding Japanese Patent Application No. 2021-036112 (date of issue Mar. 11, 2025).
(Continued)

*Primary Examiner* — Lonnie V Sweet
(74) *Attorney, Agent, or Firm* — GRUMBLES LAW PLLC; Brittany Haanan

(57) ABSTRACT

A base station includes the following parts: a propagation estimation part that estimates a radio wave propagation characteristic between a terminal and base station based on a training signal received from the terminal; a phase compensation part that compensates data to be transmitted to the terminal with phase rotation of a carrier wave that is indicated by the radio wave propagation characteristic; and a frequency conversion part that transmits the data that has been compensated by the phase compensation part to the terminal.

6 Claims, 15 Drawing Sheets

(56) References Cited

U.S. PATENT DOCUMENTS

| | | | | |
|---|---|---|---|---|
| 2016/0043839 A1* | 2/2016 | Jitsukawa | .............. | H04B 7/024 |
| | | | | 370/329 |
| 2018/0269938 A1* | 9/2018 | Kobayashi | .......... | H04B 7/0615 |
| 2019/0075535 A1 | 3/2019 | Shiobara et al. | | |
| 2021/0007083 A1* | 1/2021 | Yoon | ................. | H04L 27/26536 |
| 2021/0076389 A1* | 3/2021 | Zhang | ................. | H04L 27/2694 |
| 2022/0141064 A1* | 5/2022 | Horn | ..................... | H04W 72/23 |
| | | | | 370/329 |
| 2022/0191083 A1* | 6/2022 | Dallal | ................... | H04L 27/366 |
| 2022/0225415 A1* | 7/2022 | Shrestha | ............. | H04B 7/1851 |
| 2022/0271820 A1* | 8/2022 | Tanaka | ................ | H04B 7/0408 |
| 2023/0318717 A1* | 10/2023 | Li | ........................ | H04B 7/0639 |
| | | | | 375/262 |

OTHER PUBLICATIONS

Taoka, et al., "Special Articles on LTE-Advanced Technology—Ongoing Evolution of LTE toward IMT-Advanced: MIMO and CoMP in LTE-Advanced", NTT Docomo Technical Journal, vol. 18, No. 2, pp. 22-30, Jul. 1, 2010, published by the Telecommunications Association.

3GPP TR 36.741 V14.0.0, "Study on further enhancements to Coordinated Multi-Point (CoMP) Operation for LTE", 3GPP Organizational Partners, pp. 1-25, Release 14, 2017.

International Search Report for PCT/JP2022/005040, mailed May 17, 2022.

Saito et al., "Field Experiments on Downlink CoMP Coherent Joint Transmission Using Remote Radio Heads in LTE-Advanced", IEICE, IEICE Technical Report, pp. 49-54, RCS2013-160 (Oct. 2013).

Shiga et al., "6 Application of Space-Time Standards towards Society", NICT, Journal of NICT, pp. 201-224, vol. 65 No. 2. 2019.

Shiga et al., "Demonstration of wireless two-way interferometry (Wi-Wi)", IEICE Communications Express, vol. 6, No. 2, 2017, pp. 77-82.

Shiga et al., "Space-Time Authentication Infrastructure", presentation material for ERATO/PRESTO New Technology Presentation Meetings that is available online at JST site, pp. 1-13, Fiscal Year 2016.

Time and Frequency Transfer Group, "Wireless Two-way Interferometry", online web page of NICT.

Written Opinion for PCT/JP2022/005040, mailed May 17, 2022.

\* cited by examiner

COOPERATIVE WIRELESS DEVICE AND PROGRAM FOR SAME

TECHNICAL FIELD

The invention relates to a cooperative wireless device using wireless two-way time synchronization technology and a program thereof.

BACKGROUND ART

Cooperative wireless communication based on synchronization between base stations using a cable such as an optical fiber has been proposed (Non-Patent Literature 1) as a conventional technique. This cooperative wireless communication improves communication performance (throughput or the like) at a terminal by having base stations that are arranged in a distributed manner perform signal transmission cooperatively. For example, if signals transmitted from the base stations are controlled so that radio waves can be received in phase at the terminal, received signal power at the terminal can be greatly improved.

A conventional technique that is representative of cooperative wireless communication is Coordinated Multi-Point access (CoMP) that has been standardized by the 3GPP (Non-Patent Literature 2). In CoMP, a master base station generates a signal for data to be transmitted from each base station. Further, each base station transmits the signal after the master base station performs synchronization with each base station via a cable. The master base station is a base station that has been selected in advance from among the base stations.

Because CoMP requires cabling between base stations, there is significant cost involved in construction work and maintenance. CoMP is considered unsuitable due to its high cost for cases where, for example, base stations are temporarily installed at a construction site. If, instead of laying a cable such as an optical fiber, a wireless two-way time synchronization technology is used, it becomes possible to reduce construction and maintenance costs.

The wireless two-way time synchronization technology, which is also referred to as wireless two-way interferometry (Wi-Wi), accurately matches time of wireless devices that are located apart (Non-Patent Literatures 3 to 5).

CITATION LIST

Non-Patent Literature

Non-Patent Literature 1: NTT DoCoMo, "Field Experiments on Downlink CoMP Coherent Joint Transmission Using Remote Radio Heads in LTE-Advanced", 2013.

Non-Patent Literature 2: 3GPP TR 36.741 V14.0.0, "Study on further enhancements to Coordinated Multi-Point (CoMP) Operation for LTE", Release 14, 2017.

Non-Patent Literature 3: "Wireless Two-way Interferometry", [online], [searched on Feb. 5, 2021], <URL: https://www2.nict.go.jp/sts/tft/rsc_wiwi.html>

Non-Patent Literature 4: "Space-Time Authentication Infrastructure", [online], [searched on Feb. 5, 2021], <URL: https://shingi.jst.go.jp/var/rev0/0000/4254/2016_kisoken1_3.pdfl>

Non-Patent Literature 5: "6 Application of Space-Time Standards towards Society", [online], [searched on Feb. 5, 2021], <URL: https://www.nict.go.jp/publication/shup-pan/kihou-journal/houkoku65-2_HTML/2019S-06-01 (05-01).pdf>

SUMMARY

Technical Problem

However, with the above-described Wi-Wi, although phase synchronization of a carrier frequency can be established among base stations, it is difficult to improve received signal power at the terminal because phase variation compensation for a radio-wave propagation path is not performed.

An object of the invention is to provide a cooperative wireless device that performs phase variation compensation for a radio wave propagation path and a program thereof.

Solution to Problem

To achieve the above object, an embodiment of the present invention provides a cooperative wireless device for which synchronization of frequency and time of a carrier wave is established between another cooperative wireless device using a wireless two-way time synchronization technology. The cooperative wireless device includes: a propagation estimation part that is configured to estimate a radio wave propagation characteristic between a receiving device and the cooperative wireless device based on a training signal received from the receiving device; a phase compensation part that is configured to compensate data to be transmitted to the receiving device with phase rotation of the carrier wave indicated by the radio wave propagation characteristic; and a transmitter that is configured to transmit the data that has been compensated by the phase compensation part to the receiving device.

According to such a configuration, the cooperative wireless device can estimate the radio wave propagation characteristic between the receiving device and the cooperative wireless device and perform phase variation compensation for the radio wave propagation path.

Note that the invention may also be realized by a program for causing a computer to function as the above-described cooperative wireless device.

Advantageous Effect of Invention

According to the invention, phase variation compensation for a radio wave propagation path can be performed.

BRIEF DESCRIPTION OF DRAWINGS

FIG. 1 is a diagram showing a first example of an overall configuration of a cooperative wireless communication system according to a first embodiment.

FIG. 2 is a diagram showing a second example of an overall configuration of a cooperative wireless communication system according to the first embodiment.

FIG. 3 is a diagram showing a third example of an overall configuration of a cooperative wireless communication system according to the first embodiment.

FIG. 14 is a diagram showing a first example of an overall configuration of a cooperative wireless communication system according to a second embodiment.

FIG. 16 is a block diagram showing a configuration of a cooperative wireless communication system according to the second embodiment.

DESCRIPTION OF EMBODIMENTS

Figure 4:
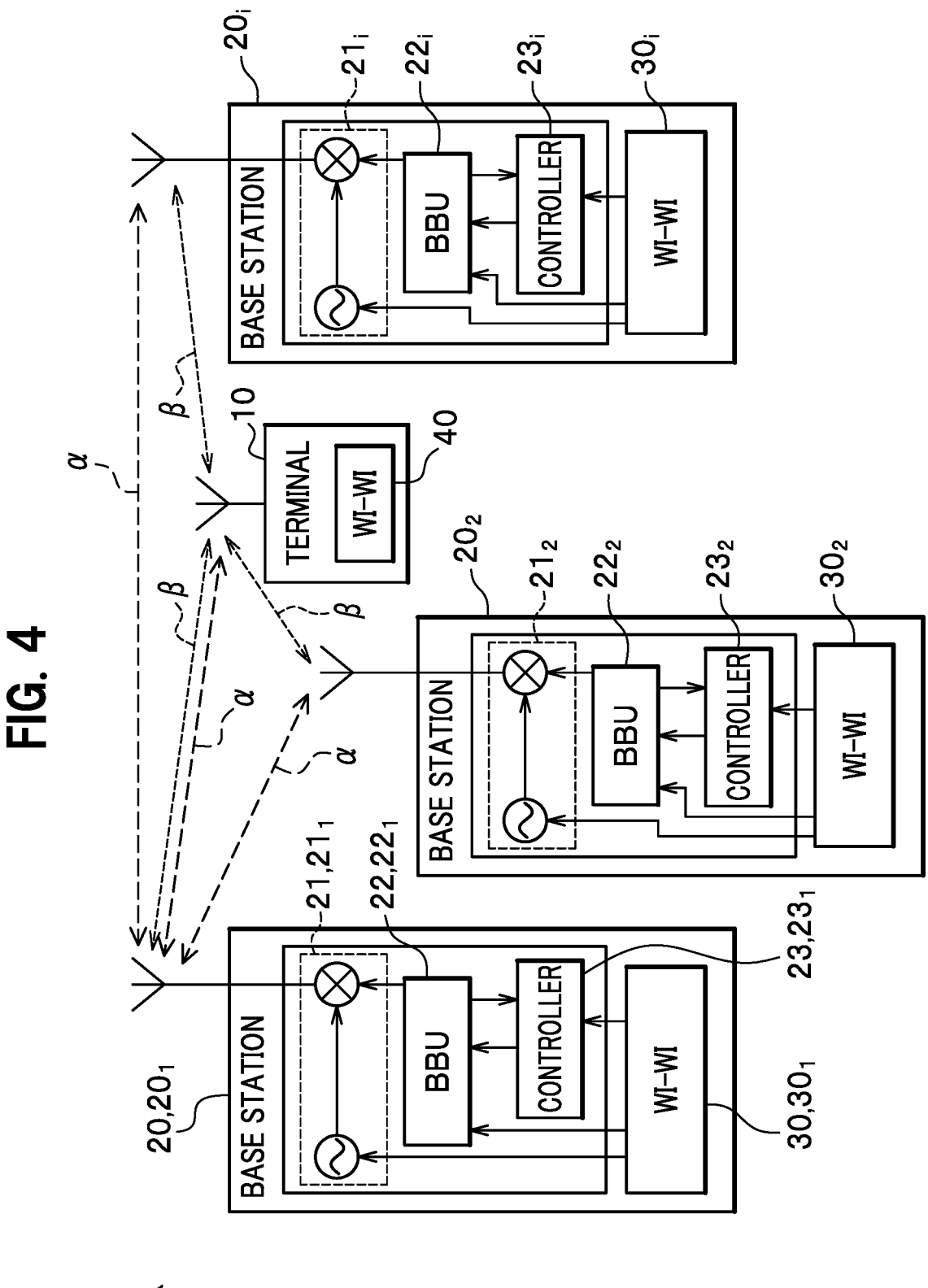
FIG. 4 is a diagram showing a fourth example of an overall configuration of a cooperative wireless communication system according to the first embodiment.

Embodiments of the invention will now be described with reference to the drawings. These embodiments that are described below are intended to embody the technical idea of the present invention, and the present invention is not limited to these embodiments unless specified otherwise. Same parts, units, or other means are denoted by the same reference signs and description thereof may be omitted.

First Embodiment

Overall Configuration of Cooperative Wireless Communication System

An overall configuration of a cooperative wireless communication system 1 according to a first embodiment will be described with reference to FIGS. 1 to 4.

Figure 1:
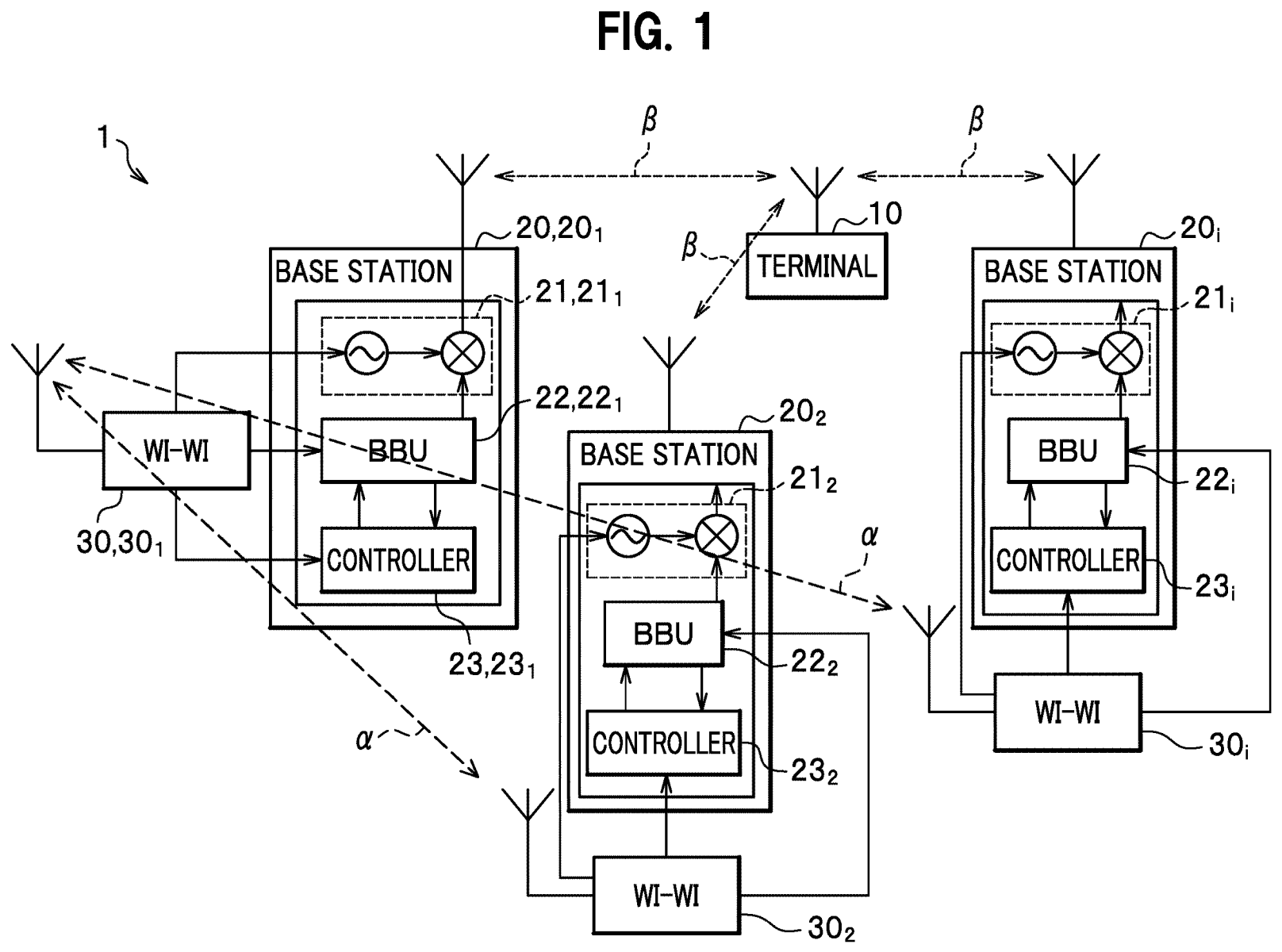

As illustrated in FIG. 1, the cooperative wireless communication system 1 includes a terminal 10, a plurality of base stations 20 ($20_1$ to $20_i$), and a plurality of modules 30 ($30_1$ to $30_i$) (where i is a natural number greater than or equal to 2). In the drawings, the module 30 is indicated as "Wi-Wi".

In the present embodiment, as an example, the terminal 10 is a "receiving device" and the base station 20 is a "cooperative wireless device". Therefore, the terminal 10 transmits a training signal to the base station 20 (uplink), and the base station 20 transmits data to the terminal 10 (downlink).

In the cooperative wireless communication system 1, only the base stations $20_1$ to $20_i$ are synchronized by Wi-Wi and the terminal 10 is not synchronized by Wi-Wi. In the cooperative wireless communication system 1, a frequency $f_{wi\text{-}wi}$ (for example, 920 MHz) of a link a used in Wi-Wi is different from a frequency $f_{com}$ (for example, 2.5 GHz) of a link β used in cooperative wireless communication ($f_{wi\text{-}wi} \neq f_{com}$).

The terminal 10 is configured to receive data from individual base stations $20_i$. In addition, the terminal 10 transmits a training signal to each base station $20_i$. The training signal is a signal for estimating a radio wave propagation characteristic between the terminal 10 and each base station $20_i$. The terminal 10 is not particularly limited as long as it has a wireless communication function and examples include a general computer, a tablet, or a smartphone.

The base stations 20 are configured to perform cooperative wireless communication by performing phase variation compensation for a radio wave propagation path on the assumption that frequency and time (clock) synchronization of carrier waves is established using Wi-Wi. Synchronization of the base stations 20 by Wi-Wi are established by means of a module 30 which will be described later. The base stations 20 perform phase variation compensation for a radio wave propagation path using the training signal received from the terminal 10 and transmits data to the terminal 10. At this time, one of the base stations 20 (for example, the base station $20_1$) is selected in advance as a master base station. Then, each base station $20_i$ transmits either data that is stored in the master base station or data that has been determined in advance to be used in the cooperative wireless communication to the terminal 10.

Each base station $20_i$ includes the same configuration, details of which will be described later.

A module 30 is provided for each base station $20_i$ and is configured to establish time and frequency synchronization of a carrier wave by Wi-Wi. Here, one of the modules 30 (for example, module $30_1$) is set as a master module, and the remaining module (for example, modules $30_2$ to $30_i$) is set as a slave module. First, a carrier phase of the master module is compared with a carrier wave phase of the slave module, and a frequency of an internal clock of the slave module is adjusted so that the start of the carrier phases of the master module and the slave module are aligned (phase lock). Next, while the phase lock is in an established state, time information is exchanged between the master module and the slave module and a time difference between the modules is adjusted. The module 30 then outputs a reference frequency (for example, 10 MHz) to an oscillator 21a and a BBU 22 and outputs reference time (for example, 1 PPS) to the BBU 22.

The overall configuration of the cooperative wireless communication system 1 is not limited to the example of FIG. 1.

Figure 2:
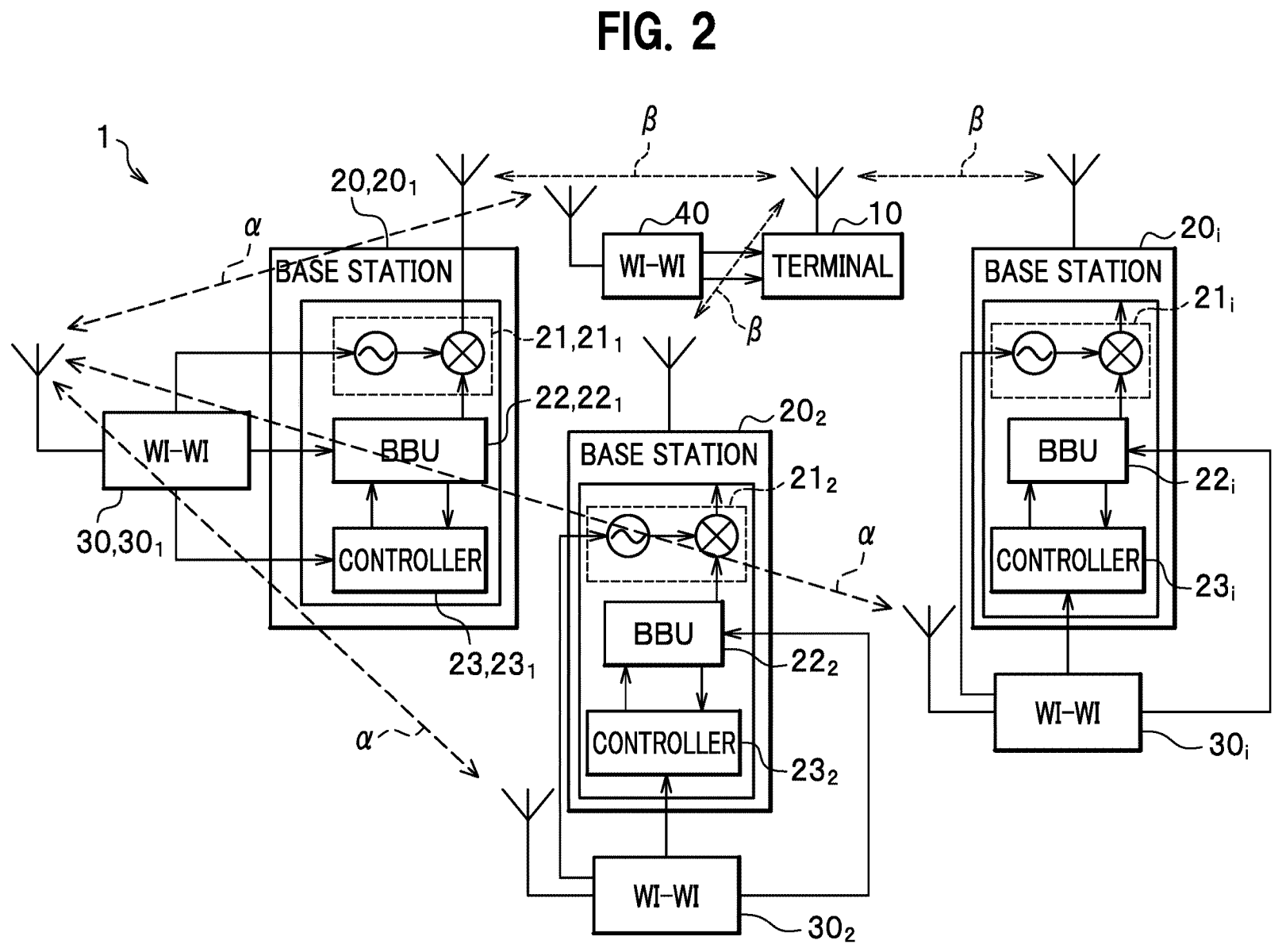

As shown in FIG. 2, the cooperative wireless communication system 1 may include a module 40 on the terminal 10 side, and the base stations $20_1$ to $20_i$ and the terminal 10 may be synchronized with each other by Wi-Wi. This module 40 is similar to the module 30. With this configuration, it is possible to shorten a preamble signal section that is required for synchronizing frequency and time (clock), such as with frame synchronization or frequency pull-in by PLL, in cooperative wireless communication. In the cooperative wireless communication system 1 of FIG. 2, the frequency $f_{wi\text{-}wi}$ of Wi-Wi and $f_{com}$ of the cooperative wireless communication are different ($f_{wi\text{-}wi} \neq f_{com}$).

Figure 3:
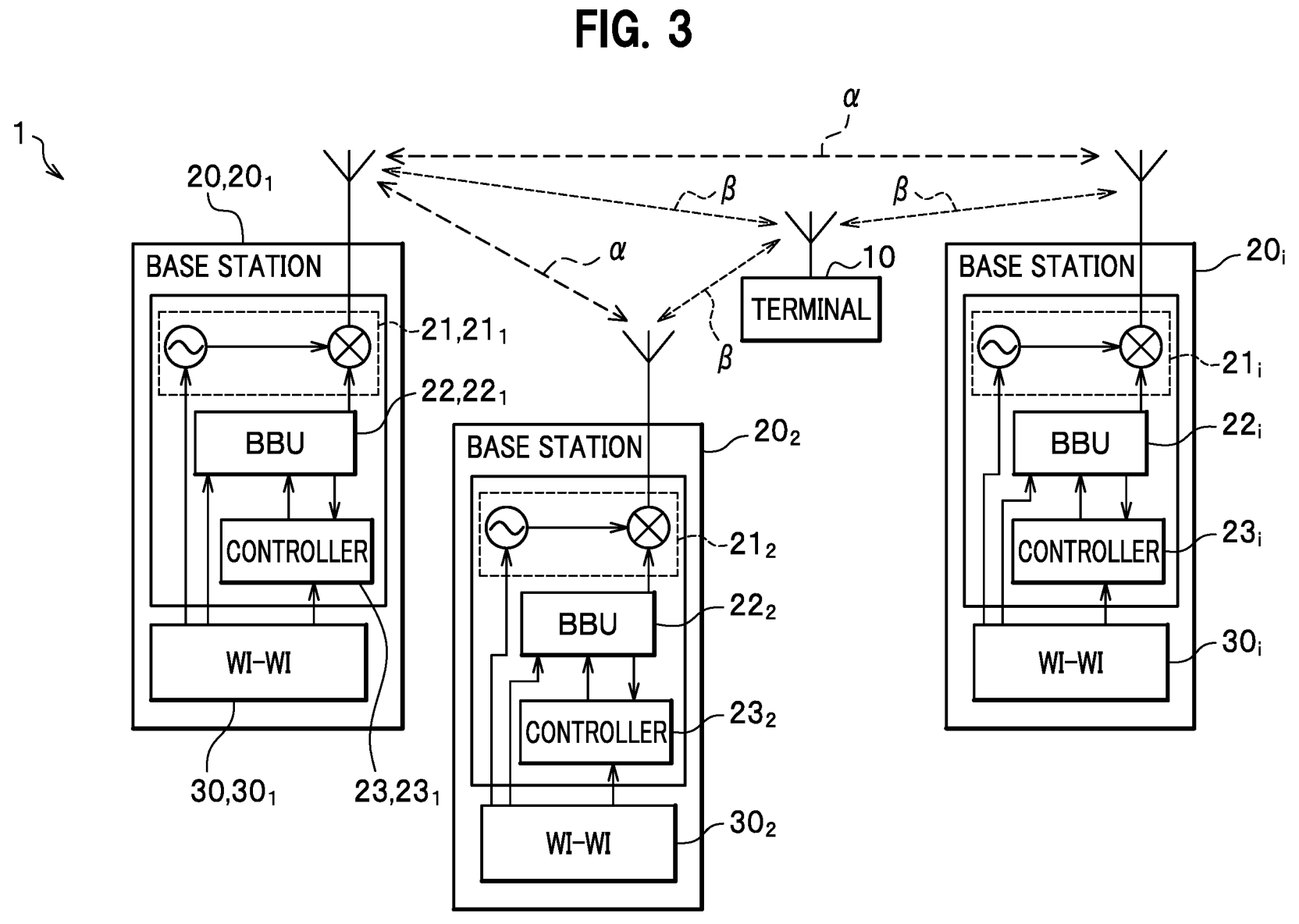

As shown in FIG. 3, in the cooperative wireless communication system 1, the frequency $f_{wi\text{-}wi}$ of Wi-Wi and $f_{com}$ of the cooperative wireless communication may be the same ($f_{Wi\text{-}Wi}=f_{com}$). That is, a frequency channel of Wi-Wi and a frequency channel of cooperative wireless communication share the same frequency. In this case, the training signal and the data are multiplexed by time division multiplexing or frequency division multiplexing. In the cooperative wireless communication system 1 of FIG. 3, only the base stations 20₁ to 20ᵢ are synchronized by Wi-Wi and the terminal 10 is not synchronized by Wi-Wi.

Furthermore, as shown in FIG. 4, in the cooperative wireless communication system 1, the frequency $f_{Wi\text{-}Wi}$ of Wi-Wi and the frequency $f_{com}$ of the cooperative wireless communication may be the same ($f_{Wi\text{-}Wi}=f_{com}$) and the base stations 20₁ to 20ᵢ and the terminal 10 may be synchronized by Wi-Wi.

Although the base station 20 and the module 30 are shown separately in FIGS. 1 and 2, the base station 20 may be configured to include the module 30 as shown in FIGS. 3 and 4.

Overview of Phase Variation Compensation

Phase variation compensation for a radio wave propagation path will be described below.

As described above, in the cooperative wireless communication system 1, synchronization of frequency and time (clock) of carrier waves is established using Wi-Wi for the base stations 20 that are arranged in a distributed manner. In the cooperative wireless communication system 1, each base station 20ᵢ performs phase variation compensation so that cooperative wireless communication (amplitude combining reception of radio waves at the terminal 10) using a plurality of base stations 20 may be performed.

First, each base station 20ᵢ estimates a radio wave propagation characteristic using a training signal received from the terminal 10 regarding a wireless frame structure that has been synchronized in terms of time and frequency with Wi-Wi. The radio wave propagation characteristic $H_i(f)$ for frequency f is expressed by the following expression (1). Therefore, the i-th base station 20ᵢ calculates an estimated value $\hat{H}_i(f)$ of the radio wave propagation characteristic $H_i(f)$ using the following expression (2). Note that $a_i(f)$ represents an amplitude, $e^z$ represents an exponential function with respect to z, j represents an imaginary unit, $p_i(f)$ represents a phase, and $\hat{}$ represents an estimated value.

Math 1

$$H_i(f)=a_i(f)e^{jp_i(f)} \tag{1}$$

Math 2

$$H_i(f)=\hat{a}_i(f)e^{j\hat{p}_i(f)} \tag{2}$$

Each base station 20ᵢ compensates data $X_D(f)$ that is to be transmitted to the terminal 10 with the phase $p_i(f)$ of the radio wave propagation characteristic $H_i(f)$ so that the terminal 10 can perform amplitude combining reception. The compensated data $X'_{D,i}(f)$ is expressed by the following expression (3).

Math 3

$$X'_{D,i}(f)=X_D(f)e^{-j\hat{p}_i(f)} \tag{3}$$

Here, when $p_i(f)=\hat{p}_i(f)$, the received signal R(f) of the terminal 10 is represented by the following expression (4).

Math 4

$$R(f)=\sum_{i=1}^{N}H_i(f)X'_{D,i}(f)=\sum_{i=1}^{N}a_i(f)X_D(f) \tag{4}$$

Assuming that $|X_D(f)|=1$ as in phase modulation, the received signal power is expressed by the following expression (5). From said expression it can be seen that amplitude combining reception is performed at the terminal 10 by the cooperative wireless communication.

Math 5

$$\sum_{i=1}^{N}a_i^2(f) \tag{5}$$

In this way, amplitude combining reception at the terminal 10 may be performed as long as $p_i(f)=\hat{p}_i(f)$ can be established. To achieve this, a phase difference between a true value of the phase, $p_i(f)$, and the estimated value of the phase, $\hat{p}_i(f)$, may be minimized.

Configuration of Terminal

A configuration of the terminal 10 will be described with reference to FIG. 5.

Figure 5:
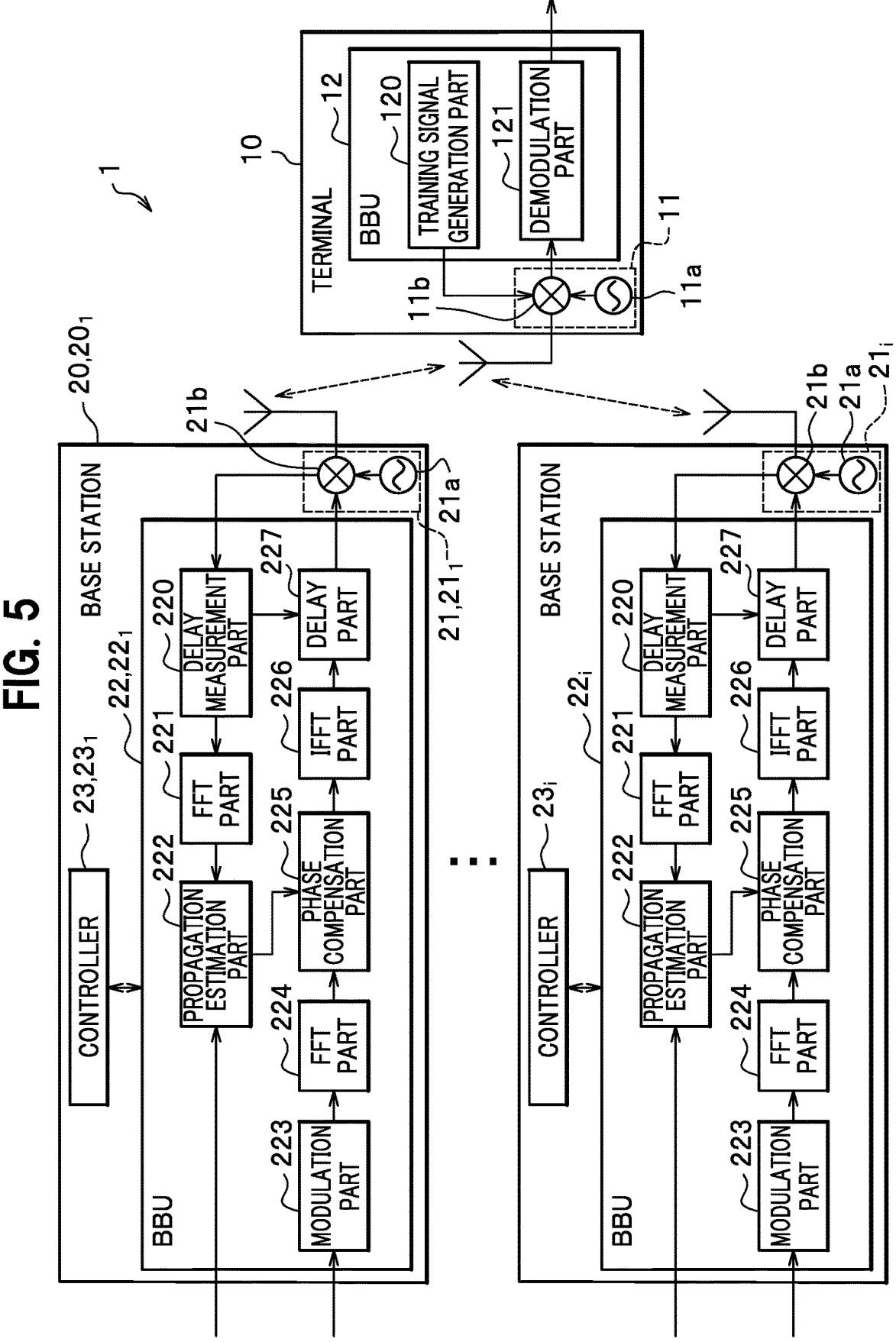
FIG. 5 is a block diagram showing a configuration of a cooperative wireless communication system according to the first embodiment.

As shown in FIG. 5, the terminal 10 includes a frequency conversion part 11 and a baseband signal processing unit (BBU) 12. In a case where the terminal 10 is synchronized with Wi-Wi, the terminal 10 may also include a module 40 (not shown in FIG. 5).

The frequency conversion part 11 is configured to perform conversion of a baseband signal used for communication with each base station 20ᵢ to a carrier frequency band (at the time of transmission) or perform reverse conversion thereof (at the time of reception). For example, the frequency conversion part 11 includes an oscillator 11a and a mixer 11b. The oscillator 11a generates a carrier wave of frequency $f_{com}$. The mixer 11b transmits a training signal that is inputted from a training signal generation part 120 over a carrier wave. Further, the frequency conversion part 11 outputs a data signal that is received from each base station 20ᵢ to a demodulation part 121.

The BBU 12 is configured to process a baseband signal and includes the training signal generation part 120 and the demodulation part 121.

The training signal generation part 120 is configured to generate a training signal $x_T(n)$ that is used by the base station 20 to estimate a radio wave propagation characteristic. Note that n indicates time (time domain). The training signal generation part 120 may generate a training signal that is generally used.

Figure 6:
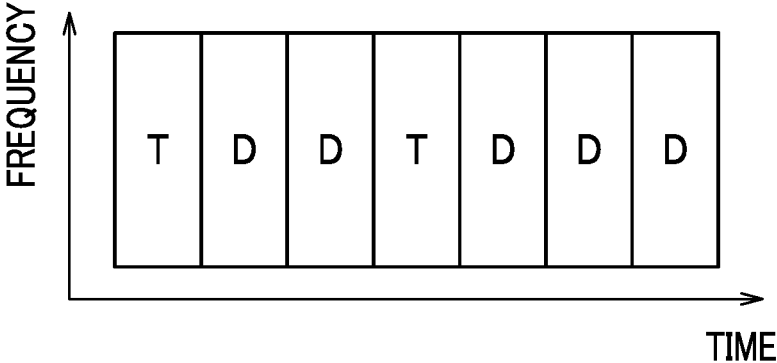
FIG. 6 is an explanatory diagram for explaining a training signal when time division multiplexing is used in the first embodiment.

Consider, for example, a case of single carrier transmission where time division multiplexing is possible, as shown in FIG. 6. In this case, the training signal generation part 120 may generate a signal having a complex constant envelope waveform such as a Zadoff-Chu sequence as the training signal $x_T(n)$. In FIG. 6, "T" represents a training signal and "D" represents data.

Figure 7:
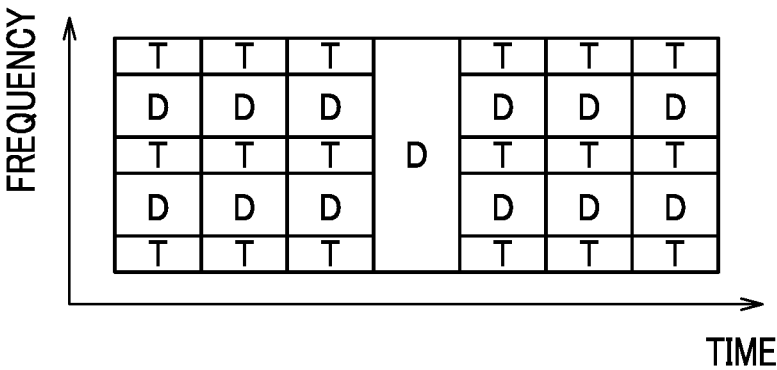
FIG. 7 is an explanatory diagram for explaining a training signal when time division multiplexing and frequency division multiplexing is used in the first embodiment.

Consider, for example, a case of OFDM transmission in which time division multiplexing and frequency division multiplexing are possible as shown in FIG. 7. In this case, the training signal generation part 120 may generate, as the training signal $x_T(n)$, a signal of a complex constant envelope waveform or a signal of a pseudo random sequence such as an m-sequence.

Here, by having the terminal 10 transmit the same training signal $x_T(n)$ to all base stations 20, the radio wave propagation characteristic $H_i(f)$ can be efficiently estimated. Instead, the terminal 10 may transmit a training signal $x_T(n)$ to each base station $20_i$ separately to estimate the radio wave propagation characteristic $H_i(f)$.

In the case of MIMO transmission that uses a plurality of antennas, a different training signal $x_T(n)$ may be transmitted for each antenna so that a radio wave propagation characteristic with each of the antenna ends may be estimated.

The demodulation part 121 is configured to demodulate data that has been received by the frequency conversion part 11 by a generally used method (for example, M-ary QAM). Because data that is inputted to the demodulation part 121 has undergone amplitude combining reception, the data is represented by the following expression (6) as a signal obtained by converting the signal of expression (4) into the time domain. Then, the demodulation part 121 outputs data~$d_D(k)$ by demodulating the data represented by expression (6). Note that $c_i(n)$ represents an amplitude in the time domain and k represents an order in a bit string.

Math 6

$$\sum_{i=1}^{N} c_i(n)\tilde{x}_{D,i}(n) \tag{6}$$

Configuration of Base Station

A configuration of the base station 20 will be described with reference to FIG. 5.

As shown in FIG. 5, a base station 20 includes a frequency conversion part (transmitter) 21, a BBU 22, and a controller 23.

As described above, the i base stations 20 have the same configuration. The module 30 has been omitted from the drawing of FIG. 5 to keep the drawing simple.

The frequency conversion part 21 is configured to convert a baseband signal used for communication with the terminal 10 into a carrier frequency band (at the time of transmission) or perform reverse conversion thereof (at the time of reception). The frequency conversion part 21 includes, for example, an oscillator 21a and a mixer 21b. The oscillator 21a generates a carrier wave of frequency $f_{com}$ in accordance with the reference frequency received from the module 30. The mixer 21b transmits data $x_D(n-\delta_i)$ inputted from the delay part 227 over the carrier wave. Further, the frequency conversion part 21 converts a training signal in the carrier wave band that is received from the terminal 10 to a baseband signal and outputs the baseband signal to the delay measurement part 220 as a training signal $x_{T,i}(n)$.

The BBU 22 is configured to process a baseband signal. For example, the BBU 22 includes a delay measurement part 220, an FFT part 221, a propagation estimation part 222, a modulation part 223, an FFT part 224, a phase compensation part 225, an IFFT part 226, and a delay part 227.

The delay measurement part 220 is configured to measure a delay time $\Delta_i$ that includes a propagation delay between the terminal 10 and a base station $20_i$ based on the training signal $x_{T,i}(n)$ received by the base station $20_i$. Because individual base stations $20_i$ have their time synchronized with each other by the modules 30 for Wi-Wi, by setting in advance a measurement start time for a delay time $\Delta_i$ among all the base stations 20, a difference in time at which the training signal $x_{T,i}(n)$ is received at each base station $20_i$ is the delay time $\Delta_i$. The delay measurement part 220 outputs the measured delay time $\Delta_i$ to the delay part 227 and outputs the training signal $x_{T,i}(n)$ received from the frequency conversion part 21 to the FFT part 221.

The FFT part 221 is configured to convert the training signal $x_{T,i}(n)$ in the time domain into a training signal $X_{T,i}(f)$ in the frequency domain through a general time-frequency conversion process. For example, the time-frequency conversion process may use a fast Fourier transform (FFT). Then, the FFT part 221 outputs the training signal $X_{T,i}(f)$ in the frequency domain to the propagation estimation part 222.

The propagation estimation part 222 is configured to estimate a radio wave propagation characteristic $H_i(f)$ between the terminal 10 and the base station $20_i$ based on the training signal $X_{T,i}(f)$ inputted from the FFT part 221. The propagation estimation part 222 may estimate the radio wave propagation characteristic $H_i(f)$ using a general method, and an example thereof will be described.

First, the propagation estimation part 222 sets in advance a reference training signal $X_T(f)$ that is not affected by the radio wave propagation characteristic $H_i(f)$. Then, the propagation estimation part 222 estimates the radio wave propagation characteristic $H_i(f)$ based on a ratio between the training signal $X_{T,i}(f)$ affected by the radio wave propagation characteristic $H_i(f)$ and the reference training signal $X_T(f)$.

As shown in FIG. 6, when the training signal $X_{T,i}(f)$ uses the entire frequency channel (in the case of time division multiplexing), the propagation estimation part 222 uses expression (7) below to estimate the radio wave propagation characteristic $H_i(f)$. That is, the propagation estimation part 222 obtains an estimated value $\hat{H}_i(f)$ of the radio wave propagation characteristic $H_i(f)$ from the ratio between the training signal $X_{T,i}(f)$ and the reference training signal $X_T(f)$ for a frequency fat which the training signal $X_{T,i}(f)$ has been transmitted by the terminal 10.

Math 7

$$\hat{H}_i(f)=X_{T,i}(f)/X_T(f) \tag{7}$$

As shown in FIG. 7, when the training signal $X_{T,i}(f)$ uses a part of the frequency channel (in the case of frequency division multiplexing such as OFDM transmission), the propagation estimation part 222 uses expression (8) below to estimate the radio wave propagation characteristic $H_i(f)$. That is, the propagation estimation part 222 obtains an estimated value $\hat{H}_i(f_S)$ of the radio wave propagation characteristic $H_i(f_S)$ from the ratio between the training signal $X_{T,i}(f)$ and the reference training signal $X_T(f)$ for a frequency $f_S$ at which the training signal $X_{T,i}(f)$ has been transmitted by the terminal 10. Further, the propagation estimation part 222 performs linear interpolation with estimated values $\hat{H}_i(f_H)$ and $\hat{H}_i(f_L)$ of the radio wave propagation characteristics $H_i(f_H)$ and $H_i(f_L)$ for a frequency $f_G$ at which the training signal $X_{T,i}(f)$ has not been transmitted by the terminal 10. Note that $f_H$ indicates the lowest frequency among frequencies that are higher than the frequency $f_S$ and for which the radio wave propagation characteristic $H_i(f)$ has been estimated. Further, $f_L$ indicates the highest frequency among frequencies that are lower than the frequency $f_S$ and for which the radio wave propagation characteristic $H_i(f)$ has been estimated.

Math 8

$$\hat{H}_i(f_S)=X_{T,i}(f_S)/X_T(f_S)$$

$$\hat{H}_i(f_G)=\hat{H}_i(f_L)+\{\hat{H}(f_H)-\hat{H}_i(f_L)\}\{f_H-f_L\}\times(f_G-f_L) \tag{8}$$

The propagation estimation part 222 then outputs the estimated radio wave propagation characteristic $H_i(f)$ to the phase compensation part 225.

The modulation part 223 is configured to modulate data $d_D(k)$ that is to be transmitted to the terminal 10 by using a general method (such as M-ary QAM) so that data $x_D(n)$ in the time domain is generated. The modulation part 223 outputs the time-domain data $x_D(n)$ to the FFT part 224.

The FFT part 224 is configured to convert the time-domain data $x_D(n)$, which is inputted from the modulation part 223, into data $X_D(f)$ in the frequency domain by using a general time-frequency conversion process. For example, the above-described FFT may be used as the time-frequency conversion process. The FFT part 224 outputs the frequency-domain data $X_D(f)$ to the phase compensation part 225.

The phase compensation part 225 is configured to compensate the data $X_D(f)$, which is inputted from the FFT part 224, with phase rotation of the radio wave propagation path that is indicated by the estimated value $\hat{H}_i(f)$ of the radio wave propagation characteristic $H_i(f)$. Specifically, the phase compensation part 225 calculates the compensated data $X'_{D,i}(f)$ by substituting into the above-described expression (3) the data $X_D(f)$ prior to compensation and the phase $\hat{p}_i(f)$ of the estimated value $\hat{H}_i(f)$ of the radio wave propagation characteristic $H_i(f)$ inputted from the propagation estimation part 222. That is, the phase compensation part 225 compensates the data $X_D(f)$ by using expression (3) to reverse in advance the effect of the phase rotation that is applied by radio wave propagation. The phase compensation part 225 then outputs the compensated data $X'_{D,i}(f)$ to the IFFT part 226.

The IFFT part 226 is configured to convert the frequency-domain data $X'_{D,i}(f)$, which has been inputted from the phase compensation part 225, into data $x'_{D,i}(n)$ that is in the time domain by using a general time-frequency reverse conversion process. For example, inverse fast Fourier transform (IFFT) may be used as the time-frequency reverse conversion process. The IFFT part 226 then outputs the time-domain data $x'_{D,i}(n)$ to the delay part 227.

The delay part 227 is configured to delay the data $x'_{D,i}(n)$, which has been inputted from the IFFT part 226, in accordance with the delay time $\Delta_i$ that is inputted from the delay measurement part 220. For example, the delay part 227 delays the data $x'_{D,i}(n)$ by a delay time $\Delta_i$ from a preset reference time $\Delta$ and outputs the delayed data $x'_{D,i}(n-\delta_i)$ to the frequency conversion part 21. Note that time $\delta_i=\Delta-\Delta_i$ is established.

Figure 8:
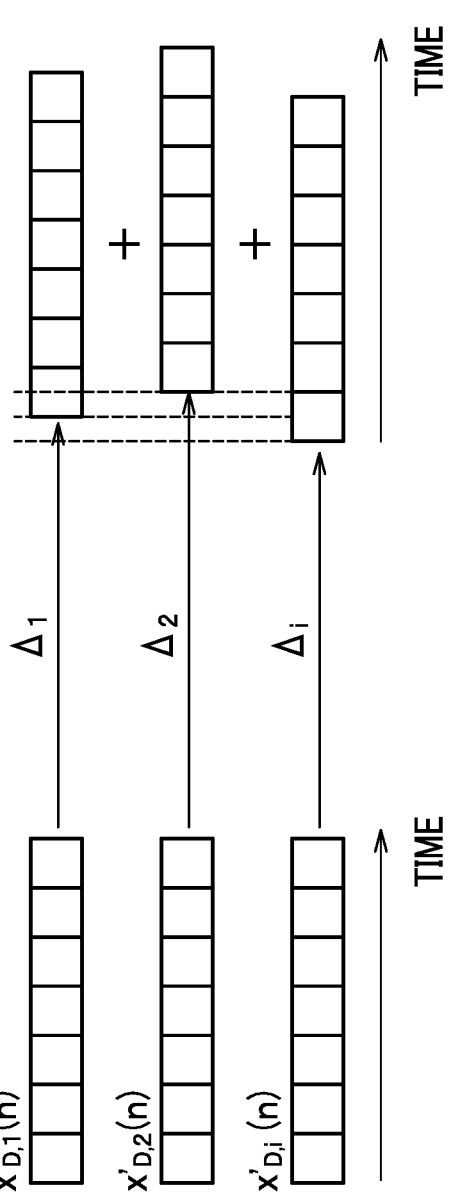
FIG. 8 is an explanatory diagram for explaining a state in which timings of receiving data do not match in the first embodiment.
Figure 9:
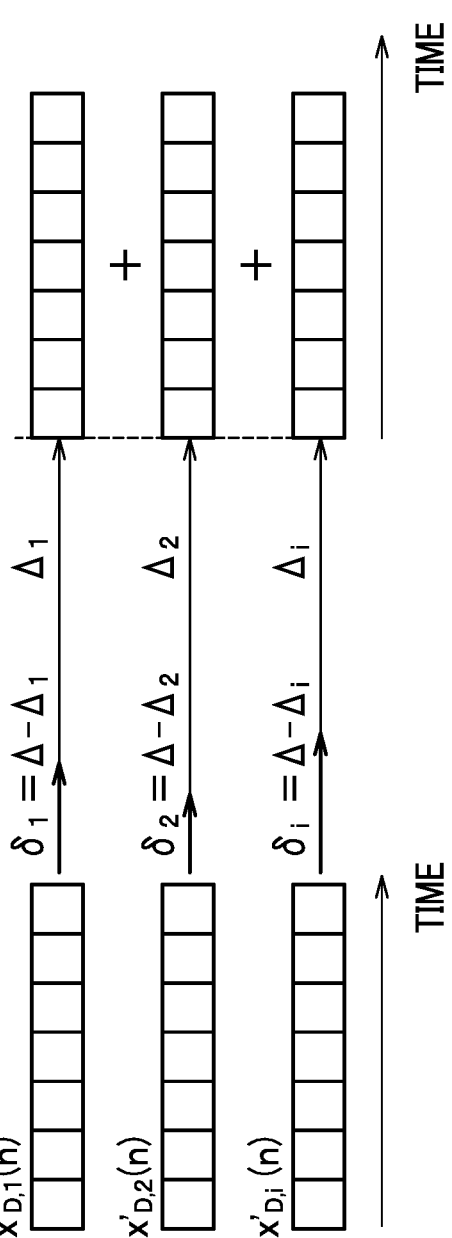
FIG. 9 is an explanatory diagram for explaining a state in which timings of receiving data coincide with each other in the first embodiment.

As shown in FIG. 8, with amplitude combining reception, because the terminal 10 adds up data $x'_{D,i}(n)$ received from individual base stations $20_i$, a loss of received power occurs when the reception timings of individual data $x'_{D,i}(n)$ do not match. The delay part 227 suppresses the loss of received power by delaying, as shown in FIG. 9, individual data $x'_{D,i}(n)$ by time $\delta_i(\delta_1, \delta_2, \ldots, \delta_i)$ so that the reception timings of the individual data $x'_{D,i}(n)$ coincide. In this way, the base stations 20 can perform phase synchronization across the entire data signals even when discrete data sequences are transmitted.

Returning to FIG. 5, the description of the configuration of the base station 20 will be continued.

The controller 23 is configured to perform various controls of the BBU 22. Specifically, the controller 23 determines whether to participate in the cooperative wireless communication through threshold processing of a time difference between the master base station and a base station $20_i$ and threshold processing of received power of the training signal. The controller 13 controls data transmission by the BBU 22 based on a result of the determination.

The controller 13 will be described in more detail later.

Cooperative Wireless Communication Between Terminal and Base Station

Cooperative wireless communication between the terminal 10 and the base stations 20 will be described with reference to FIGS. 10 to 12.

Figure 10:
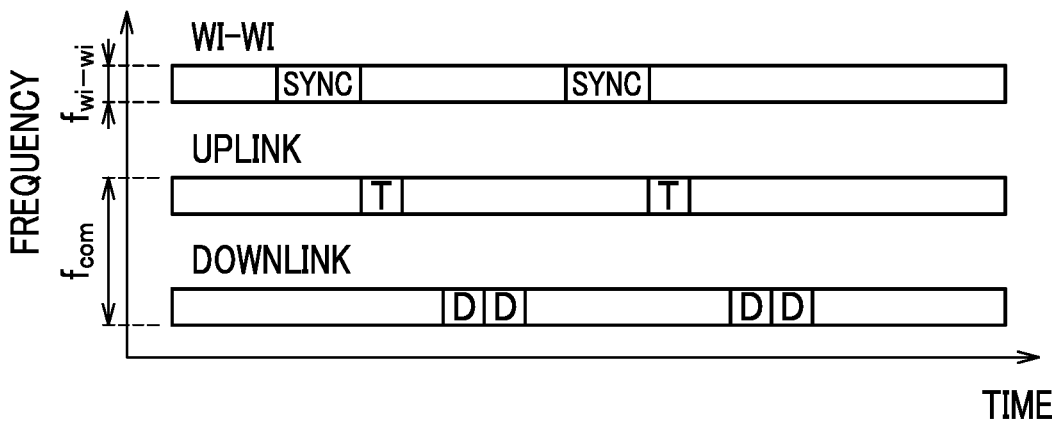
FIG. 10 is an explanatory diagram for explaining a first example of cooperative wireless communication between a terminal and a base station in the first embodiment.
Figure 11:
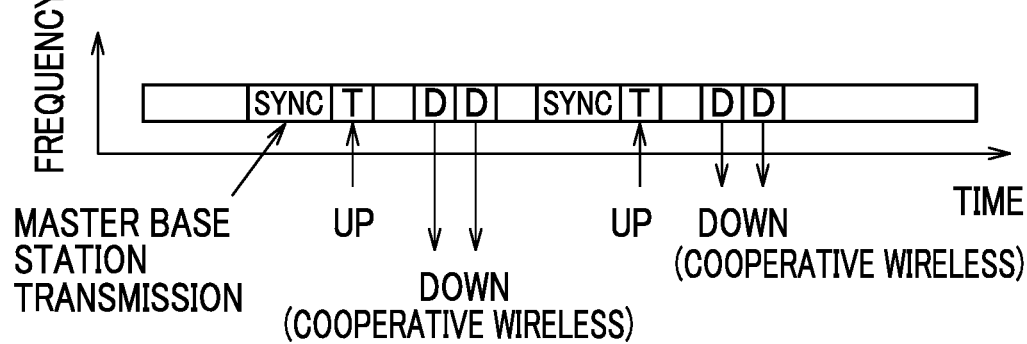
FIG. 11 is an explanatory diagram for explaining a second example of cooperative wireless communication between a terminal and a base station in the first embodiment.
Figure 12:
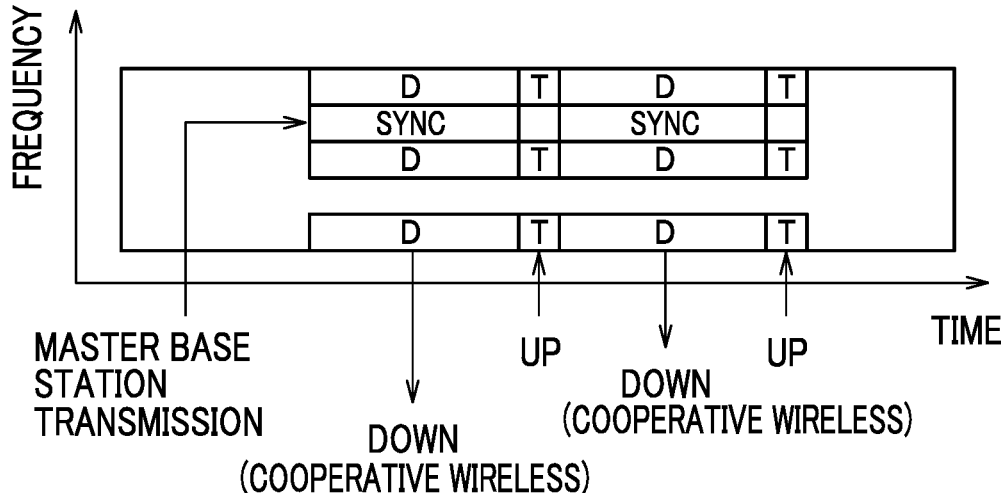
FIG. 12 is an explanatory diagram for explaining a third example of cooperative wireless communication between a terminal and a base station in the first embodiment.

In FIGS. 10 to 12, "synchronization" refers to synchronization by Wi-Wi, "T" represents a training signal, and "D" represents data.

A case is shown in FIG. 10 where the frequency $f_{Wi\text{-}Wi}$ for Wi-Wi and the frequency $f_{com}$ for cooperative wireless communication are different. In this case, in the cooperative wireless communication system 1, after synchronization by Wi-Wi is complete, the terminal 10 transmits a training signal to each base station $20_i$ via an uplink and each base station $20_i$ measures the radio wave propagation characteristic. Thereafter, in the cooperative wireless communication system 1, each base station $20_i$ transmits data to the terminal 10 via a downlink.

A case is shown in FIG. 11 where the frequency $f_{Wi\text{-}Wi}$ for Wi-Wi and the frequency $f_{com}$ for cooperative wireless communication are the same and time division multiplexing is performed. In this case, in the cooperative wireless communication system 1, after synchronization by Wi-Wi is complete, the terminal 10 transmits a training signal to each base station $20_i$ and each base station $20_i$ measures the radio wave propagation characteristic. Thereafter, in the cooperative wireless communication system 1, each base station $20_i$ transmits data to the terminal 10.

A case is shown in FIG. 12 where the frequency $f_{Wi\text{-}Wi}$ for Wi-Wi and the frequency $f_{com}$ for cooperative wireless communication are the same and frequency-division multiplexing and time-division multiplexing are performed. In this case, in the cooperative wireless communication system 1, each base station $20_i$ transmits data to the terminal 10 at the same time as synchronization by the Wi-Wi. Thereafter, in the cooperative wireless communication system 1, the terminal 10 transmits a training signal to each base station $20_i$ and each base station $20_i$ measures the radio wave propagation characteristic.

The cooperative wireless communication between the terminal 10 and the base stations 20 is not limited to the examples of FIGS. 10 to 12.

Operation of Cooperative Wireless Communication System

Figure 13:
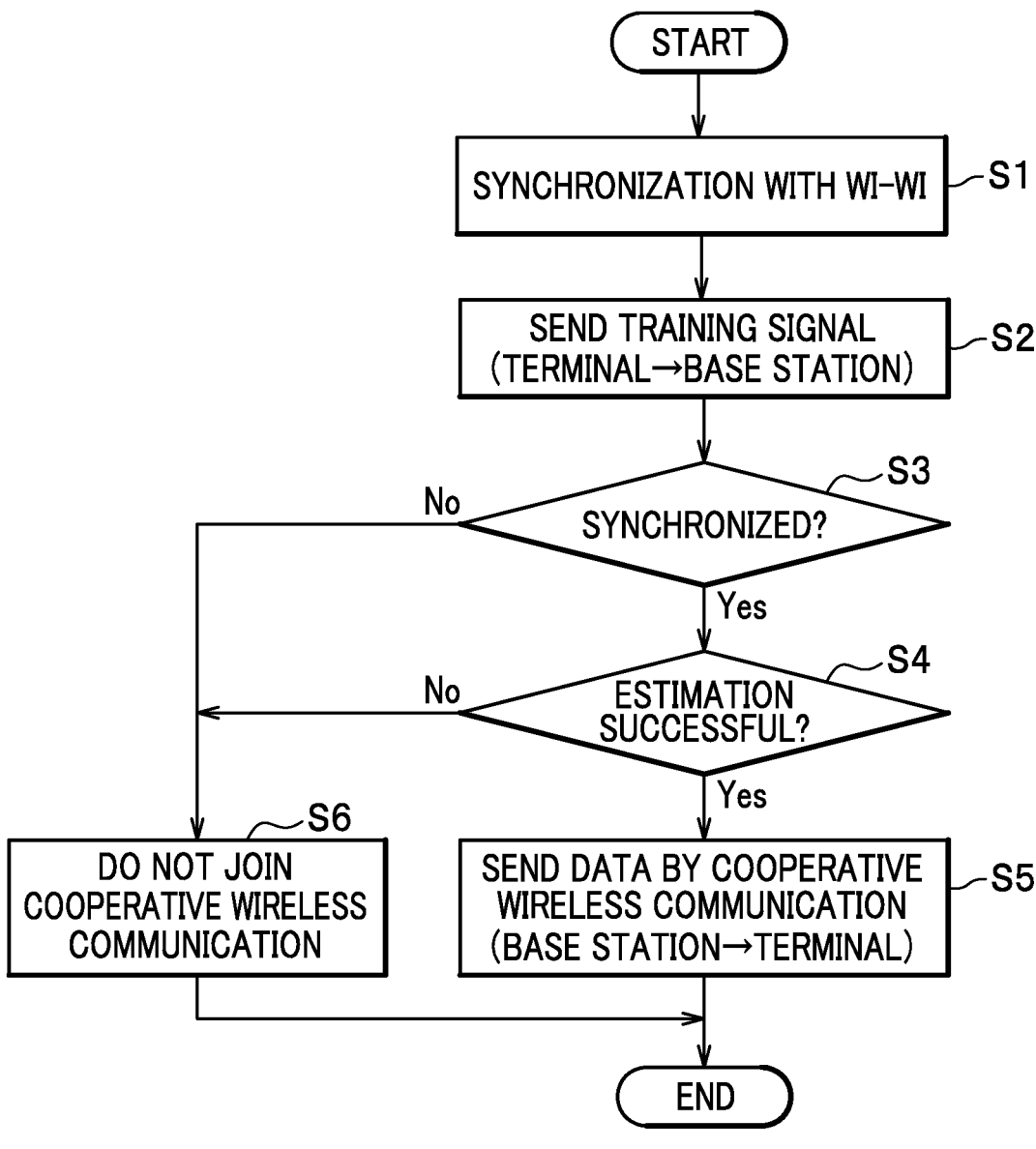
FIG. 13 is a flowchart showing an operation of a cooperative wireless communication system according to the first embodiment.

An operation of the cooperative wireless communication system 1 will be described with reference to FIG. 13.

In step S1, each base station $20_i$ establishes synchronization by Wi-Wi with the master module being used as a standard. Here, in a case where the terminal 10 is equipped with a module 40, the terminal 10 may also establish synchronization by Wi-Wi.

In step S2, the terminal 10 transmits a training signal to each base station $20_i$.

In Step S3, each base station $20_i$ determines with the controller 23 whether synchronization by Wi-Wi has been established. To be more specific, the controller 23 determines whether a time difference between the master base station and the base station $20_i$ is less than a first threshold that has been set in advance. Note that the master base station may not perform the process of step S3.

When the time difference is greater than or equal to the first threshold (No in step S3), the controller 23 determines that synchronization by Wi-Wi has not been established and proceeds to the processing step S6.

When the time difference is less than the first threshold (Yes in step S3), the controller 23 determines that synchronization by Wi-Wi has been established and proceeds to the processing step S4.

In step S4, each base station $20_i$ determines with the controller 23 whether the estimation of the radio wave propagation characteristic has been successful. Specifically, the controller 23 determines whether the received power of the training signal is greater than or equal to a second threshold that has been set in advance.

When the received power of the training signal is less than the second threshold (No in step S4), the controller 23 determines that the estimation of the radio wave propagation characteristic is not successful and proceeds to the processing step S6.

When the received power of the training signal is greater than or equal to the second threshold (Yes in step S4), the controller 23 determines that the estimation of the radio wave propagation characteristic is successful and proceeds to the processing step S5.

In step S5, each base station $20_i$ transmits data to the terminal 10 with the frequency conversion part 21 by cooperative wireless communication and ends the processing.

In Step S6, since each base station $20_i$ does not participate in the cooperative wireless communication, data is not transmitted to the terminal 10 and the processing ends.

Action and Effect

As described above, the cooperative wireless communication system 1 according to the first embodiment can estimate the radio wave propagation characteristic between the terminal 10 and the base station 20 and perform phase variation compensation for the radio wave propagation path. As a result, the cooperative wireless communication system 1 does not need to lay a cable such as an optical fiber and can therefore reduce costs for construction and maintenance. For example, the cooperative wireless communication system 1 can provide stable cooperative wireless communication even in an environment in which the radio wave propagation characteristic is likely to change, such as when a robot that moves close to the ground is remote controlled.

Second Embodiment

Overall Configuration of System

Figure 14:
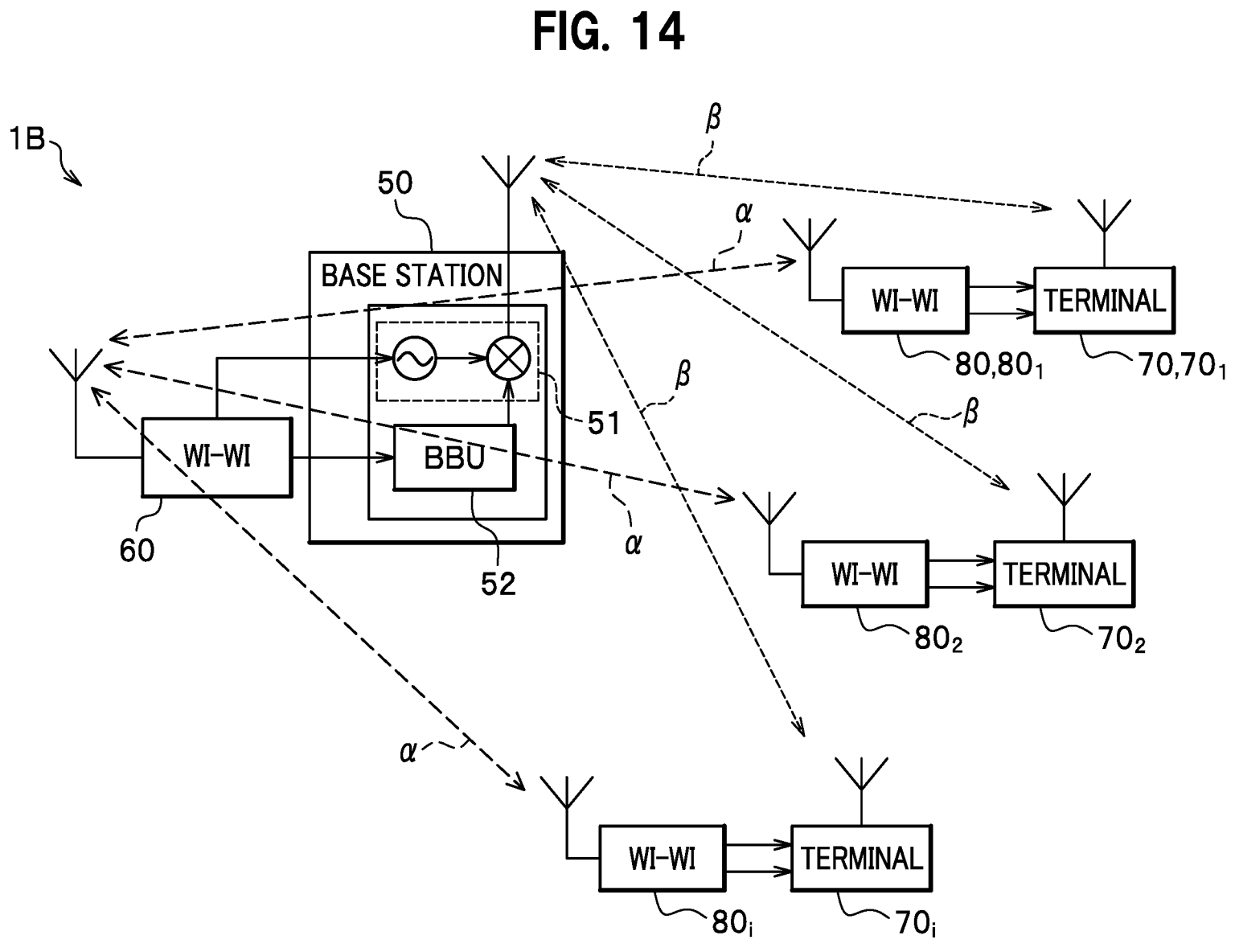
Figure 15:
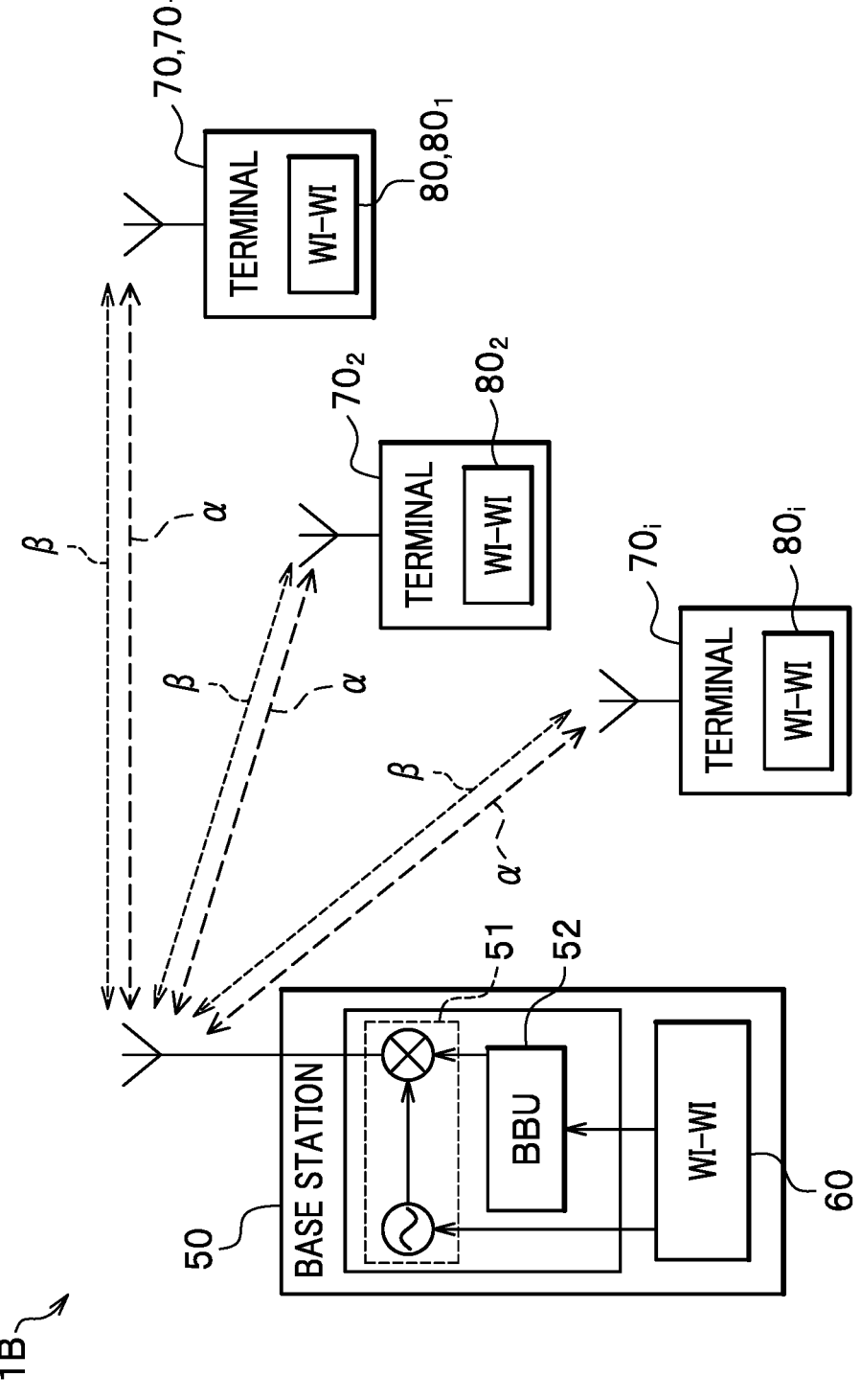
FIG. 15 is a diagram showing a second example of an overall configuration of a cooperative wireless communication system according to the second embodiment.

With reference to FIGS. 14 and 15, an overall configuration of a cooperative wireless communication system 1B according to a second embodiment will be described with a focus on points that are different from the first embodiment.

The cooperative wireless communication system 1B is different from the first embodiment in that a base station 50 transmits a training signal to a terminal 70 and the terminal 70 transmits data to the base station 50. In the present embodiment, the base station 50 is a "receiving device" and the terminal 70 is a "cooperative wireless device".

As shown in FIG. 14, the cooperative wireless communication system 1B includes the base station 50, a module 60, a plurality of terminals 70 ($70_1$ to $70_i$), and a plurality of modules 80 ($80_1$ to $80_i$) (where i is a natural number that is greater than or equal to 2).

In the cooperative wireless communication system 1B, the base station 50 and the terminals $70_1$ to $70_i$ are synchronized by Wi-Wi. Further, in the cooperative wireless communication system 1B, a frequency $f_{wi\text{-}wi}$ of a link a that is used in Wi-Wi and a frequency $f_{com}$ of a link β that is used in cooperative wireless communication are different from each other ($f_{wi\text{-}wi} \neq f_{com}$). With this configuration, it is possible to shorten a preamble signal section that is required for synchronizing frequency and time (clock), such as by frame synchronization or frequency pull-in by PLL, in cooperative wireless communication.

The base station 50 is configured to receive data from each terminal $70_i$. Further, the base station 50 is configured to transmit a training signal to each terminal $70_i$. The training signal is used for estimating a radio wave propagation characteristic between the base station 50 and each terminal $70_i$.

The module 60 is provided corresponding to the base station 50 and is configured to establish synchronization of frequency and time (clock) of a carrier wave by Wi-Wi. The frequency and time (clock) synchronization of the carrier wave by Wi-Wi is the same as that of the first embodiment, and further description thereof will be omitted.

The terminals 70 are configured to perform cooperative wireless communication by performing phase variation compensation for a radio wave propagation path on the assumption that synchronization of frequency and time (clock) of the carrier waves has been established using Wi-Wi. The terminals 70 are synchronized by Wi-Wi by means of the modules 80. Further, the terminals 70 perform phase variation compensation for a radio wave propagation path using the training signal received from the base station 50 and transmits data to the base station 50. At this time, one of the terminals 70 (for example, the terminal $70_1$) is selected in advance as a master terminal. Then, each terminal $70_i$ transmits data that is stored in the master terminal or data that has been determined in advance to be used at the time of cooperative wireless communication to the base station 50.

The terminals $70_i$ have the same configuration, a details of which will be described later.

A module 80 is provided for each terminal $70_i$ and is configured to establish synchronization of time and frequency of the carrier waves by Wi-Wi. Here, the module 60 of the base station 50 is referred to as a master module and the modules 80 of the terminals 70 are referred to as slave modules. Synchronization of frequency and time (clock) of the carrier waves by Wi-Wi is the same as that of the first embodiment, and further description will thus be omitted.

Although in FIG. 14 the base station 50 and module 60 are illustrated separately, the base station 50 may include the module 60. Although the terminal 70 and module 80 are illustrated separately, the terminal 70 may include the module 80.

An overall configuration of the cooperative wireless communication system 1B is not limited to the example of FIG. 14.

As shown in FIG. 15, frequency $f_{wi\text{-}wi}$ of the link a used in Wi-Wi and frequency $f_{com}$ of the link β used in cooperative wireless communication may be the same ($f_{wi\text{-}wi} = f_{com}$) in the cooperative wireless communication system 1B. That is, a frequency channel of Wi-Wi and a frequency channel of cooperative wireless communication may be shared. In this case, the training signal and data are multiplexed by time division multiplexing or frequency division multiplexing. In the cooperative wireless communication system 1B of FIG.

15, the base station 50 and terminals 70$_1$ to 70$_i$ are synchronized with each other by Wi-Wi.

Configuration of Base Station

Figure 16:
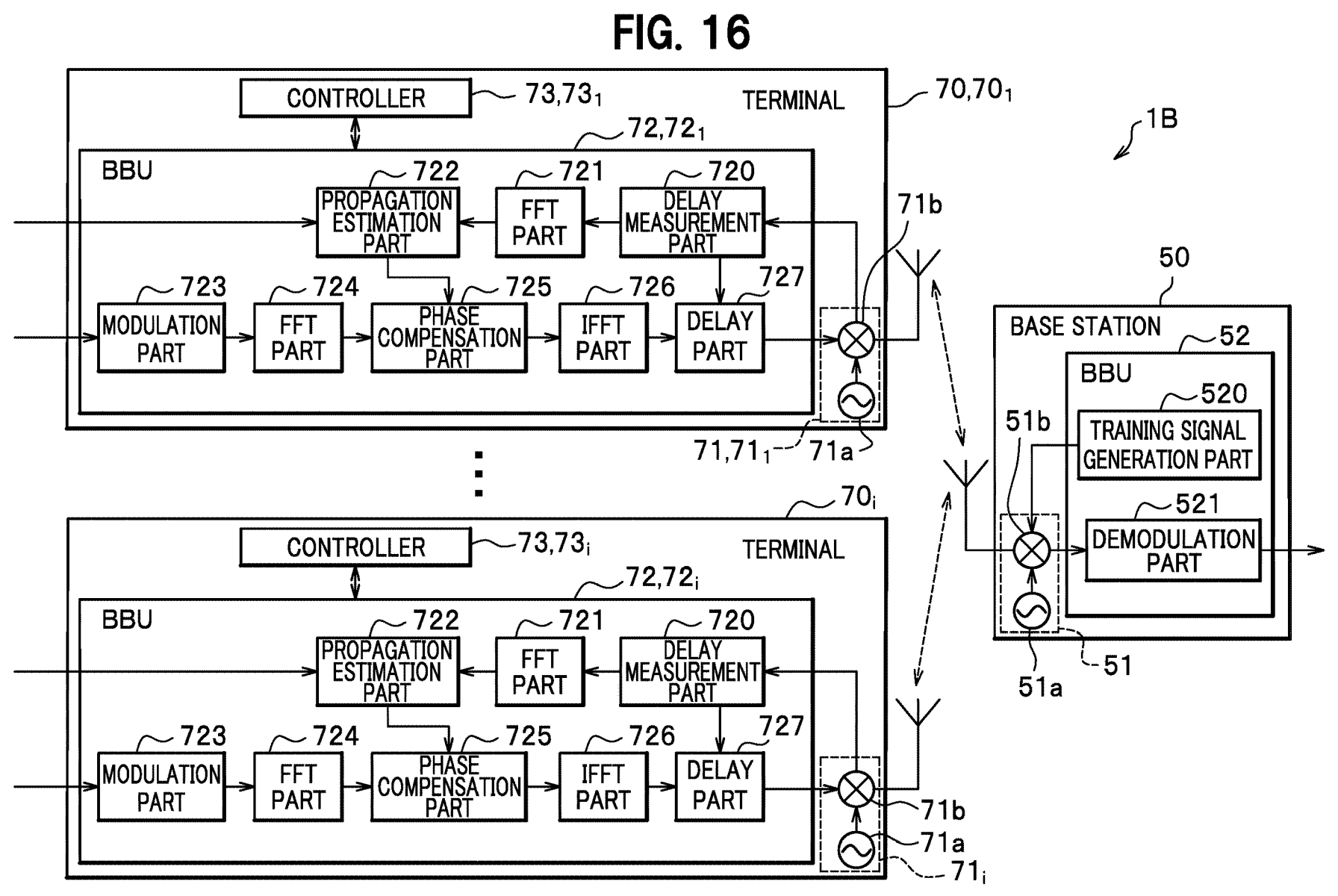

A configuration of the base station 50 will be described with reference to FIG. 16. In FIG. 16, the modules 60 and 80 are omitted in order to keep the drawing simple.

As shown in FIG. 16, the base station 50 includes a frequency conversion part 51 and a BBU 52.

The frequency conversion part 51 is configured to perform conversion of a baseband signal that is used for communication with each terminal 70$_i$ into a carrier frequency band (at the time of transmission) or perform reverse conversion thereof (at the time of reception). The frequency conversion part 51 includes, for example, an oscillator 51$a$ and a mixer 51$b$.

The BBU 52 is configured to process the baseband signal and includes a training signal generation part 520 and a demodulation part 521.

The parts of the base station 50 are the same as those of the terminal 10 of FIG. 5 and further description will therefore be omitted.

Configuration of Terminal

A configuration of the terminal 70 will be described with reference to FIG. 16.

As shown in FIG. 16, the terminal 70 includes a frequency conversion part 71, a BBU 72, and a controller 73.

The frequency conversion part 71 is configured to convert a baseband signal that is used for communication with the base station 50 into a carrier frequency band (at the time of transmission) or perform reverse conversion thereof (at the time of reception). The frequency conversion part 71 includes, for example, an oscillator 71$a$ and a mixer 71$b$.

The BBU 72 is configured to process the baseband signal. For example, the BBU 72 includes a delay measurement part 720, an FFT part 721, a propagation estimation part 722, a modulation part 723, an FFT part 724, a phase compensation part 725, an IFFT part 726, and a delay part 727.

The parts of the terminal 70 are the same as those of the base station 20 of FIG. 5 and further description will therefore be omitted.

Operation of Cooperative Wireless Communication System

Figure 17:
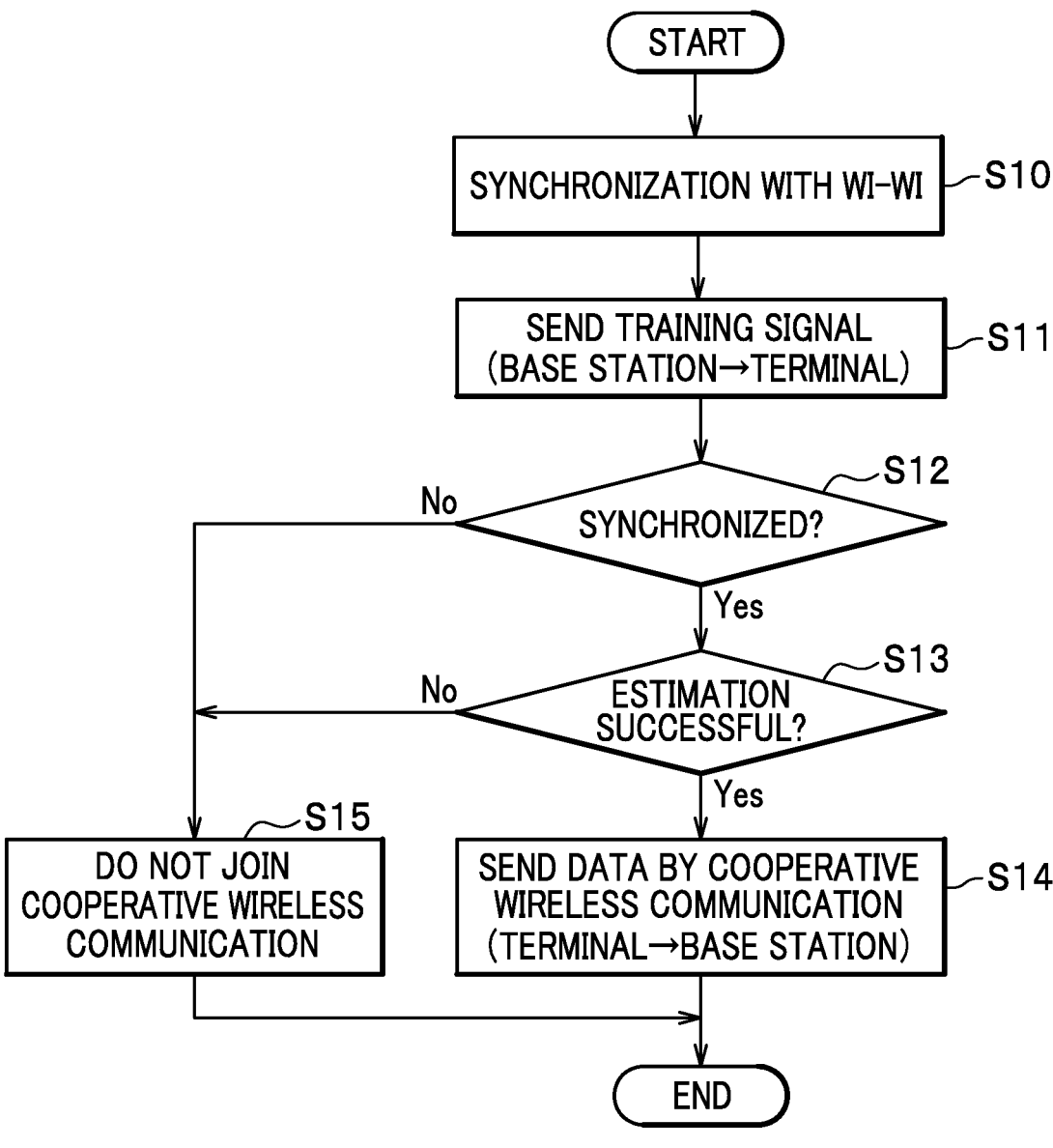
FIG. 17 is a flowchart showing an operation of a cooperative wireless communication system according to the second embodiment.

An operation of the cooperative wireless communication system 1B will be described with reference to FIG. 17.

In step S10, individual terminals 70$_i$ establishes synchronization by Wi-Wi with the master module (module 60 of the base station 50) being used as a standard.

In step S11, the base station 50 transmits a training signal to each terminal 70$_i$.

In step S12, each terminal 70$_i$ determines with the controller 73 whether synchronization by Wi-Wi has been established. To be more specific, the controller 73 determines whether a time difference between the master terminal and the terminal 70$_i$ is less than a third threshold that has been set in advance. Note that the master terminal may not perform the processing step S12.

When the time difference is greater than or equal to the third threshold (No in step S12), the controller 73 determines that synchronization by Wi-Wi has not been established and proceeds to the processing step S15.

When the time difference is less than the third threshold (Yes in step S12), the controller 73 determines that synchronization by Wi-Wi has been established and proceeds to the processing step S13.

In step S13, each terminal 70$i$ determines with the controller 73 whether the estimation of the radio wave propagation characteristic is successful. Specifically, the controller 73 determines whether the received power of the training signal is equal to or greater than a fourth threshold that has been set in advance.

When the received power of the training signal is less than the fourth threshold (No in step S13), the controller 73 determines that the estimation of the radio wave propagation characteristic is not successful and proceeds to processing step S15.

When the received power of the training signal is equal to or greater than the fourth threshold (Yes in step S13), the controller 73 determines that the estimation of the radio wave propagation characteristic is successful and proceeds to processing step S14.

In step S14, each terminal 70$_i$ transmits data to the base station 50 with the frequency conversion part 71 by cooperative wireless communication and ends the process.

In Step S15, since each terminal 70$_i$ does not participate in the cooperative wireless communication, data is not transmitted to the base station 50 and the process ends.

Action and Effect

As described above, the cooperative wireless communication system 1B according to the second embodiment can estimate the radio wave propagation characteristic between the base station 50 and the terminal 70 and perform phase shift compensation for the radio wave propagation path. In the cooperative wireless communication system 1B, it is therefore not necessary to lay a cable such as an optical fiber and the cost required for construction and maintenance can be suppressed. For example, the cooperative wireless communication system 1B can provide stable cooperative wireless communication even in an environment where the radio wave propagation characteristic is likely to change, such as when a robot moving near the ground is remote controlled.

Embodiments of the invention have been described in detail above, but the invention is not limited thereto. The invention includes one or more embodiments with a design change or the like that is within a range not departing from the gist of the invention.

Although each of the embodiments have been described as performing cooperative wireless communication, the invention is not limited thereto. For example, the invention can be applied not only to wireless communication but also to wireless power transmission. Because received signal power is significantly improved, the invention becomes a highly efficient means of wireless power transmission and leads to achieving a non-conventional battery-free wireless terminal.

Although the cooperative wireless device has been described as independent hardware in the above embodiments, the invention is not limited thereto. For example, the cooperative wireless device may be realized by a program that causes hardware resources such as a CPU, a memory, and a hard disk included in a computer to cooperatively operate as the above-described parts. Said program may be distributed via a communication line or may be distributed by being written on a non-transitory storage medium such as a CD-ROM or a flash memory.

EXAMPLE

Figure 18:
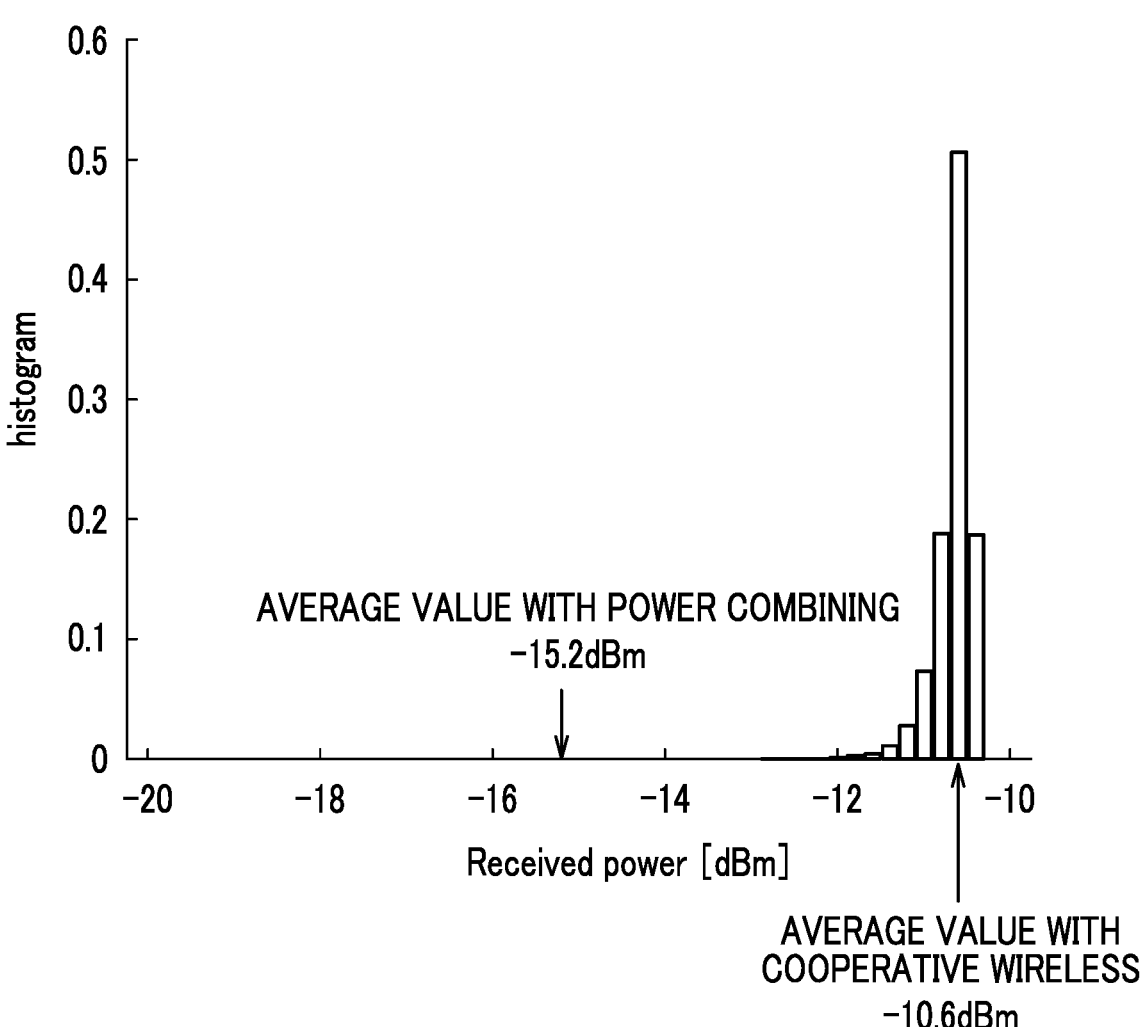
FIG. 18 is a graph showing a simulation result of a cooperative wireless communication system of an embodiment.

Referring to FIG. 18, as an example, a simulation result of received signal power in a cooperative wireless communication system according to the invention will be described.

A cooperative wireless communication system including three base stations was evaluated by computer simulation. The radio wave propagation model was a free space model. Actual measurement values were used for the synchronization deviation (jitters) in Wi-Wi synchronization. A training signal of a Zadoff-Chu sequence with cyclic extension and a protocol by time division multiplexing of FIG. 10 were used. The frequency from of cooperative wireless communication was 2 GHz. Under these conditions, received signal power of a terminal located at an equal distance of 50 meters away from each base station was evaluated.

As shown in FIG. 18, the average value with conventional power combining was −15.2 dBm. On the other hand, with the cooperative wireless communication system according to the present invention, the average value of the received signal power improved to −10.6 dBm. Since the difference between the two values is 4.6 dB (=2.88) and the difference in the case of ideal amplitude combining is 4.8 dB (=3.00), it was found that an ideal characteristic can be obtained with the cooperative wireless communication system according to the present invention.

DESCRIPTION OF SYMBOLS

1, 1B Cooperative wireless communication system
10 Terminal (receiving device)
11 Frequency conversion part
11*a* Oscillator
11*b* Mixer
12 BBU (baseband signal processing unit)
120 Training signal generation part
121 Demodulation part
20 (20₁ to 20*i*) Base station (cooperative wireless device)
21 Frequency conversion part (transmitter)
21*a* Oscillator
21*b* Mixer
22 BBU (baseband signal processing unit)
220 Delay measurement part
221 FFT part
222 Propagation estimation part
223 Modulation Part
224 FFT part
225 Phase compensation part
226 IFFT part
227 Delay part
23 Controller
30 (301 to 30*i*) Module
40 Module
50 Base station (receiving device)
51 Frequency conversion part
52 BBU
51*a* Oscillator
51*b* Mixer
520 Training signal generation part
521 Demodulation part
60 Module
70 (70₁ to 70*i*) Terminal (cooperative wireless device)
71 Frequency conversion part (transmitter)
71*a* Oscillator
71*b* Mixer
72 BBU
720 Delay measurement part
721 FFT part
722 Propagation estimation part
723 Modulation part
724 FFT part
725 Phase compensation part
726 IFFT part
727 Delay part
73 Controller
80 (80₁ to 80*i*) Module

The invention claimed is:

1. A cooperative wireless device that is a base station and that generates a carrier wave whose synchronization in frequency and time with other carrier waves generated by other cooperative wireless devices, that are other base stations, is established using a wireless two-way time synchronization technology, the cooperative wireless device comprising:

a controller; and
a transmitter, wherein
the controller is configured to:
estimate a radio wave propagation characteristic between a receiving device and the cooperative wireless device based on a training signal received over an uplink from the receiving device to the cooperative wireless device, the receiving device being a terminal;
compensate data to be transmitted over a downlink from the cooperative wireless device to the receiving device with phase rotation of a radio-wave propagation path indicated by the radio wave propagation characteristic; and
determine whether to participate in cooperative wireless communication by:
threshold processing of a time difference between the cooperative wireless device and one master cooperative wireless device that has been selected in advance from among the other cooperative wireless devices; and
threshold processing of received power of the training signal, and
the transmitter is configured to transmit the data that has been compensated by the compensation part controller to the receiving device over the downlink in response to the controller determining to participate in the cooperative wireless communication.

2. The cooperative wireless device according to claim 1, wherein
the controller is configured to:
measure a delay time with the training signal; and
delay the data that has been compensated by the controller according to the delay time that has been measured by the controller, and
the transmitter is configured to transmit the data that has been delayed by the controller to the receiving device.

3. The cooperative wireless device according to claim 1, wherein the controller is configured to:
preset a reference training signal that has not been affected by the radio wave propagation characteristic; and
estimate the radio wave propagation characteristic based on a ratio between the training signal that has been affected by the radio wave propagation characteristic and the reference training signal.

4. The cooperative wireless device according to claim 1, wherein
the wireless two-way time synchronization technology is wireless two-way interferometry.

5. The cooperative wireless device according to claim 1, wherein
the controller is configured to determine not to participate in the cooperative wireless communication when the time difference between the cooperative wireless device and the master cooperative wireless device is greater than or equal to a predetermined first threshold or when the received power of the training signal is less than a predetermined second threshold.

6. A non-transitory storage medium storing a program for causing a computer to function as a cooperative wireless device that is a base station and that generates a carrier wave whose synchronization in frequency and time with other carrier waves generated by other cooperative wireless devices, that are other base stations, is established using a wireless two-way time synchronization technology, the cooperative wireless device comprising:

a controller; and a transmitter, wherein the controller is configured to:

estimate a radio wave propagation characteristic between a receiving device and the cooperative wireless device based on a training signal received over an uplink from the receiving device to the cooperative wireless device, the receiving device being a terminal;

compensate data to be transmitted over a downlink from the cooperative wireless device to the receiving device with phase rotation of a radio-wave propagation path indicated by the radio wave propagation characteristic; and determine whether to participate in cooperative wireless communication by:

threshold processing of a time difference between the cooperative wireless device and one master cooperative wireless device that has been selected in advance from among the other cooperative wireless devices; and threshold processing of received power of the training signal, and the transmitter is configured to transmit the data that has been compensated by the controller to the receiving device over the downlink in response to the controller determining to participate in the cooperative wireless communication.

\* \* \* \* \*